Patented Sept. 12, 1933

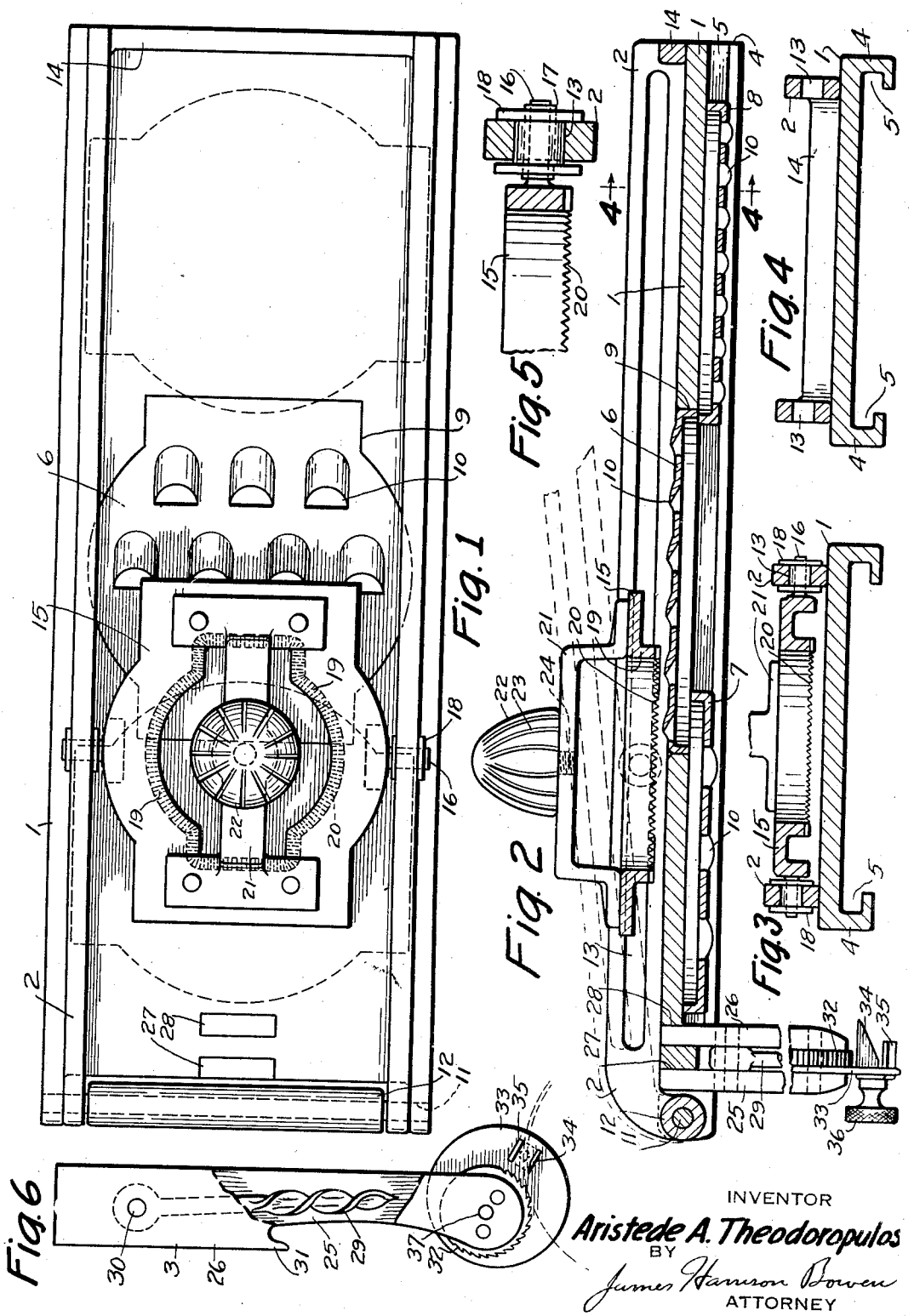

1,926,735

UNITED STATES PATENT OFFICE 1,926,735

COMBINATION VEGETABLE SLICER

Aristede A. Theodoropulos, New York, N. Y.

Application May 20, 1932. Serial No. 612,396

6 Claims. (Cl. 146—168)

The invention is a device for slicing vegetables or the like in which the slide is mounted in rollers in guide members and the base is provided with grooves in which the cutting members may be stored when not in use.

The invention is also constructed so that the handle by which it may be held may also be used for a can opener, bottle opener, and may have a cork screw therein.

The object of the invention is to improve the construction of vegetable slicers so that the sliding member may operate more freely.

Another object of the invention is to improve the construction of vegetable slicers so that the entire device is more solid and has a more positive movement than any similar device now in use.

Another object of the invention is to provide a vegetable slicer in which the sliding member operates with a rolling instead of a sliding movement.

Another object of the invention is to provide a vegetable slicer in which provision is made in the base of the slicer for storing the different cutting members.

A further object of the invention is to provide a vegetable slicer in which a cutting member is freely held in an opening in the base, and in which the cutting members not in use may be used to support the cutting member being used.

A still further object of the invention is to extend the scope of vegetable slicers so that they may also be used for opening cans and bottles.

And a still further object of the invention is to provide a vegetable slicer which is of a solid construction and at the same time comparatively simple and economical.

With these ends in view the invention embodies a vegetable slicer having a base, guides pivotally mounted upon the base, a sliding member slidable in said guides, a plurality of cutters of different types, and a removable handle having a can opener, bottle opener and cork screw therein.

Other features and advantages of the invention will appear from the following description taken in connection with the drawing, wherein:—

Figure 1 is a plan view showing the general arrangement of the device.

Figure 2 is a longitudinal section thru the center of the device.

Figure 3 is a cross section thru the base and sliding member with a part of the handle omitted.

Figure 4 is a cross section on line 4—4 of Figure 2.

Figure 5 is a detail showing one of the rollers at one side of the sliding member, mounted in a frame.

Figure 6 is a view showing the handle with part broken away.

In the drawing the device is shown as it would be made wherein numeral 1 indicates the base, numeral 2 the frame, and numeral 3 the handle.

The base 1 may be made as shown with a flat piece of material having channel shaped members 4 at the sides providing grooves 5 which extend continuously along the base and in which the cutting members, as indicated by the numerals 6, 7 and 8, may be mounted. It will be noted that the grooves 5 are open at one end of the base and the cutters may be placed in the grooves at the open end and may be moved to any position in the base. An opening 9 is provided in the base, as shown in Figure 1, and this opening is the same size as the periphery of the cutters so that the cutters may be placed therein, as shown in Figure 2, in which the cutter 6 is placed in the opening 9. Other cutters in the grooves 5 may be moved so that they will remain under the cutter in the opening 9 and thereby hold the cutter in the opening in the upper position, as shown in Figure 2. The cutters may be provided with sharp projecting edges or teeth 10 and it will be noted that these teeth may be of any shape or size and may be arranged in any manner.

At one end of the base is a pin 11 and the frame 2 is pivotally mounted on this pin and held by a roller 12 which forms a spacer between the ends of the frame. The side members of the frame are provided with slots 13 and at one end of the frame is a cross bar 14 which will hold the open end. A sliding member 15 is mounted in the slots 13, as shown in Figure 5, with pins 16 extending from the sides of the member 15 and these pins extend thru sleeves 17 in flanged rollers 18 and it will be noted that the rollers 18 are mounted in the slots 13 and are readily moved backward and forward or to any position in the frame. The member 15 is provided with a downwardly extending flange 19, which is shaped as shown in Figure 1, and the lower edge of which is provided with teeth 20 so that a potato or the like may be held therein and moved backward and forward across one of the cutters. It will be understood that any other means may be used for holding the potato or the like to the sliding member 15. The sliding member 15 is provided with a handle 21 and this has a knob 22 with vertical grooves 23 in the surface thereof extending upward from the handle and attached to it by a screw 24. It will be noted that by gripping the knob 22 on the handle 21 it will readily be possible to move the slide from one end to the other of the grooves 13. The frame 2 is pivotally mounted on the pin 11 and the outer end may be raised, as shown in dotted lines, so that a potato may be placed on the sliding member 15 and if it is desired to slice the potato the frame may be lowered until the potato engages the teeth 10 of the cutter and it will be noted that as the cutter removes parts of the potato it will move downward until it arrives at the position shown in Figure 2. The entire device and the parts may be made of chromium or other rustless metal, or may be plated, as desired.

The handle 3 may be round or of any shape, however in the design shown it is made with two bars 25 and 26 that may be inserted in openings 27 and 28 in the plate of the base 1 with the handle projecting downward, as shown in Figure 2, and it will be noted that with the handle held in the left hand the sliding member 15 may be moved backward and forward over the base with the rollers operating in the slots 13 of the frame 2. The handle 3 may be provided with a cork screw 29 which is pivotally mounted therein on a pin 30 and at one side of the handle are projections 31 which form a bottle cap opener that may be used independent of the slicer or while the handle is in place. At the lower end of the handle is a stationary gear 32 and a pivotally mounted disc 33 which may be used as a can opener. The disc is provided with a downwardly extending knife 34 and a bar 35 adapted to co-operate therewith and to engage the outer surface of the can to smooth the outer surface as the can is opened. A knob 36 may extend from the opposite side of the disc 33 and this may be used to force the knife 34 into the top of the can in order to start the can opener. With the handle removed from the base, as shown in Figure 6, and held in position over a can, a slight tap on the knob 36 will force the knife 34 into the of the can and then by working the handle backward and forward the gear 32 will force the can to move against the knife and thereby cut the top out of the can. It will be appreciated that opening a can in this manner leaves a rough edge on the outside and the bar 35 is therefore provided to bear against the outside of the can and smooth the surface thereof. The teeth of the gear or ratchet 32 are shaped as shown so that they will draw the can against the knife and the disc 33 may be pivotally mounted on a pin 37 so that it will hold the knife in the proper position in relation to the gear.

It will be understood that other changes may be made in the construction without departing from the spirit of the invention. One of which changes may be in the use of a base of a different type or design, another may be in the use of other means for holding the cutting members in the base, another may be in the shape or design of the frame 2 or in the use of other means for pivotally mounting it upon the base, another may be in the use of other means for holding the slide 15 in the frame, another may be in the use of other means for holding vegetables or the like in the slide 15, and still another may be in the use of a handle of a different type or design.

The construction will be readily understood from the foregoing description. In use the device may be provided as shown and it will be noted that one of the cutters may be placed in the opening 9 and a potato, or other vegetable, or the like, may be placed in the member 15 and with the frame 2 slightly raised the member 15 may be moved backward and forward across the cutter in the opening 9 so that the potato will be sliced or diced or cut into any desired shapes. It will be understood that the cutters 6, 7 and 8 are readily interchangeable as either cutter may be placed in the opening 9 when it is desired to use the machine and either cutter may be placed in the grooves 5 of the base when it is not in use. It will also be understood that cutters of any other type or design may be used. It will be noted that with this particular arrangement it is possible for the slide 15 to move all the way from one end of the base to the other so that the entire machine may be used. It will also be noted that the cutters are freely mounted in the opening 9 and are held in the position shown in Figure 2 by other cutters placed in the groove 5 in the base as the cutter being used rests upon the cutters that are not being used. This provides a positive means for holding the cutters and eliminates the necessity of having special grooves or other means in the opening. It will also be noted that the slide 15 is mounted in the slots 13 by rollers so that there is a rolling contact instead of a sliding contact as is normally used in devices of this nature. It will also be noted that the knob 22 is scored or provided with grooves so that it may be firmly held. The entire construction of the device is rigid and provides a solid durable machine for slicing vegetables which may readily be operated and which will last indefinitely and while it is appreciated that there are other similar devices on the market, the other devices are made of wire and tin so that they only last a short time whereas this device is made of comparatively heavy castings and will last indefinitely.

Having thus fully described the invention what I claim as new and desire to secure by Letters Patent, is:

1. In a vegetable slicer of the character described, a base having an opening in the face thereof for cutters or the like and a storage chamber for cutters in the underside thereof, a frame having slots in the sides thereof pivotally mounted upon said base, a slide having rollers at the sides thereof mounted in the slots of said frame, said rollers being in axial alignment providing a two point suspension and a plurality of cutters of different designs adapted to be inserted in the opening of said base and also to be stored in the underside of said base said cutters stored in the base adapted to support the cutter being used.

2. In a combination vegetable slicer, a comparatively flat base with an opening for cutters in the surface thereof and slots in the underside thereof into which cutters may be stored, cutters adapted to be inserted in said opening and also held in said slots, the cutters in said slots adapted to support the cutter in said opening, a slide adapted to hold vegetables or the like above said cutters, and means mounting said slide upon said base permitting longitudinal movement thereof.

3. A combination vegetable slicer having a base, a slide slidably mounted above said base, means for holding vegetables or the like in said slide, and means in the base for storing cutters said base having an opening therein adapted to receive one of said cutters and said storing means adapted to position the stored cutters to hold the cutter in the opening.

4. In a vegetable slicer as described in claim 3, a removable handle extending downward from one end adapted to hold the slicer in an inclined position.

5. In a vegetable slicer as described in claim 3, a knob having vertical grooves in the surface thereof on the upper side of said slide providing gripping means.

6. A vegetable slicer as described in claim 3 in which the vegetable holding means comprises a downwardly extending circular flange on said slide with offset portions in the sides thereof corresponding with the longitudinal axis of said slicer, and said flange having teeth in the lower edge thereof.

ARISTEDE A. THEODOROPULOS.